METHOD OF AND APPARATUS FOR PRODUCING TELEVISION PICTURES
Filed Oct. 20, 1952
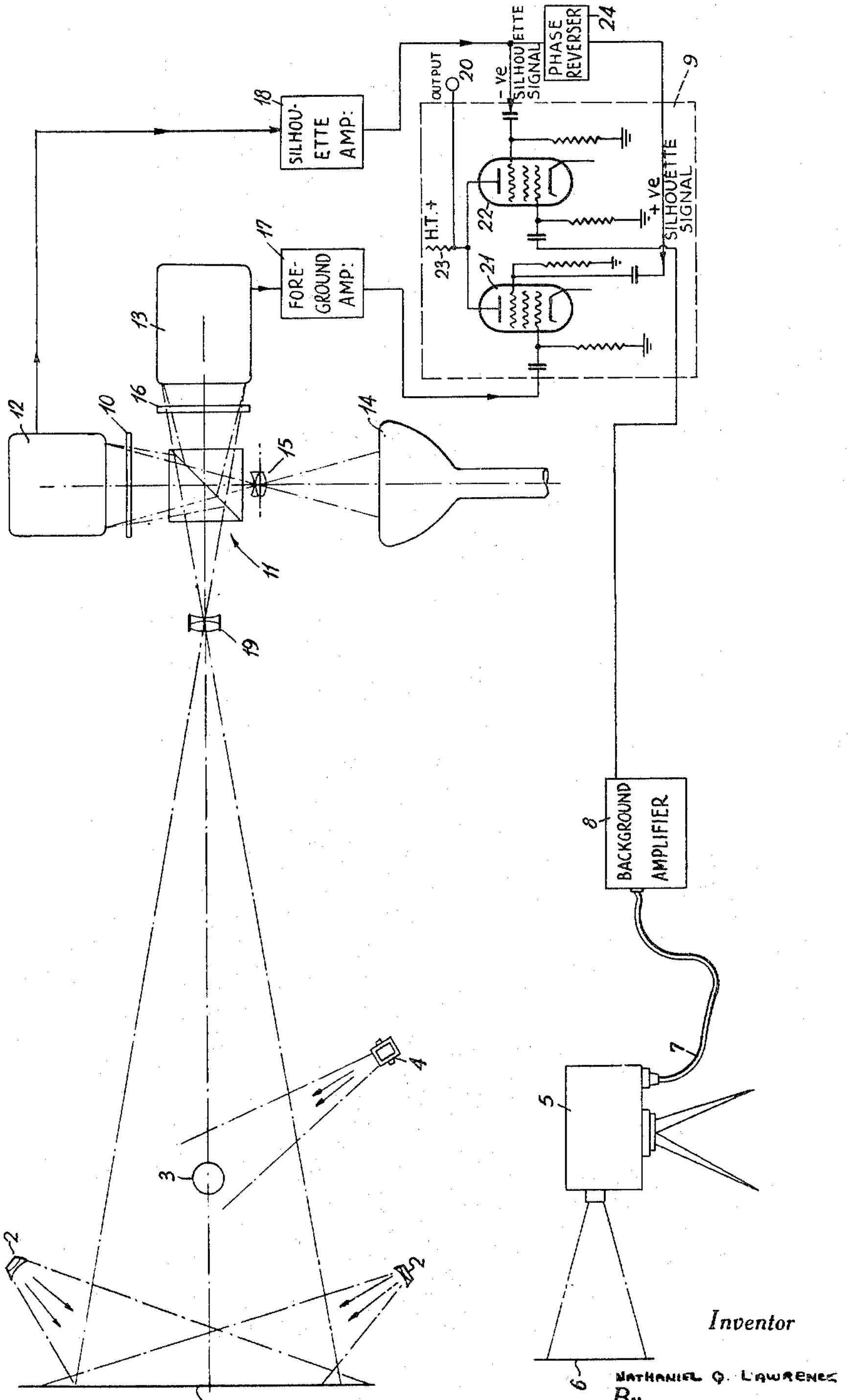
Inventor
NATHANIEL Q. LAWRENCE
By Emery Holcombe & Blair
Attorney United States Patent Office 2,753,395

Patented July 3, 1956

2,753,395

METHOD OF AND APPARATUS FOR PRODUCING TELEVISION PICTURES

Nathaniel Q. Lawrence, Cambridge, England, assignor to Pye Limited, Cambridge, England, a British company Application October 20, 1952, Serial No. 315,693

Claims priority, application Great Britain October 26, 1951

8 Claims. (Cl. 178—7.2)

The present invention relates to a method of and apparatus for producing television pictures, and more particularly to a method of and apparatus for producing composite television pictures by combining separate picture signals representing respectively background components, such as scenery, and foreground components, such as persons or objects.

From one aspect the present invention consists in a method of producing a composite television picture of the kind referred to which consists in illuminating a plain background with visible or invisible light of a wavelength lying in a first band of frequencies, disposing the foreground components in front of said plain background and illuminating the foreground components with visible or invisible light of a wavelength lying in a second band of frequencies different from said first band of frequencies, producing a first television picture signal of the foreground components as a silhouette against the plain background by projecting the image of the plain background and foreground components on to a first pick-up tube through a filter which rejects light waves in said second frequency band, producing a second television picture signal, from the same viewpoint as the first television picture signal, of the detail content of the foreground components against a dark background by projecting the image of the plain background and foreground components on to a second pick-up tube through a filter which rejects light waves in said first frequency band, producing a third television picture signal of the background components required, and combining the second and third television picture signals, whilst using the first television picture signal to blank out from the composite signal those parts of the third television picture signal which occupy positions in the raster corresponding to the positions of the foreground components in the second television picture signal.

The television picture signal of the background components may be produced from a television camera, film scanner or in any other desired manner.

The present invention also consists in apparatus for producing a composite television picture of the kind referred to, comprising a first light source illuminating a plain background with visible or invisible light of a wavelength lying in a first band of frequencies, a second light source illuminating the foreground components disposed in front of said plain background with visible or invisible light of a wavelength lying in a second band of frequencies different from said first band of frequencies, a first television pick-up tube, a second television pick-up tube, means for projecting on to said first and second pick-up tubes, from a common viewpoint, images of the foreground components in front of the plain background, a filter which rejects light waves in said second frequency band interposed only in the path of the image projected on to said first pick-up tube, a filter which rejects light waves in said first frequency band interposed only in the path of the image projected on to said second pick-up tube, means for simultaneously scanning the target electrodes of said first and second pick-up tubes in synchronism to produce two television signals in synchronism in the outputs of said first and second pick-up tubes, means for producing a third television picture signal in synchronism with said other television signals of the background components required, a mixing circuit, means for feeding the output television signal from said second pick-up tube to said mixing circuit, means for feeding said third television signal to said mixing circuit, means for blanking out, before mixing with the signal from the second pick-up tube, selected parts of said third television signal, and means for controlling said blanking out means by the output signal from said first pick-up tube.

From another aspect, the invention consists in apparatus for producing a composite television picture of the kind referred to, comprising a first television pick-up tube, a second television pick-up tube, a filter arranged in front of said second tube which rejects light waves in a first frequency band, a filter arranged in front of said first tube which rejects light waves in a second frequency band different from said first frequency band, optical means arranged in front of said pick-up tube whereby they both receive images from the same viewpoint, and means for simultaneously scanning the target electrodes of the first and second pick-up tubes in synchronism.

Preferably the two pick-up tubes are photo-scanned image-iconoscope tubes as described and claimed in United States Patent No. 2,619,531 to Donald Weighton, issued November 25, 1952, and are both scanned by light from a single moving light spot, preferably produced by a scanning raster on the screen of a cathode ray tube. The light from the raster may be simultaneously projected on to the photo-cathodes of the two tubes by means of a suitable light splitting system.

In order that the invention may be more fully understood, one embodiment thereof will now be described with reference to the accompanying drawing.

In the drawing, the plain background comprises a white or light coloured screen 1, which is illuminated with ultra-violet light from light sources 2. The foreground components 3, for example actors, are illuminated with visible light from which the ultra-violet component has been filtered out, from a light source 4. The screen 1 is set well back from the foreground components 3, so that it does not pick up any stray light from the foreground area.

The camera which is arranged to scan the plain background and the foreground components in order to produce both the silhouette picture against the illuminated background, and the picture of the illuminated foreground components against the unlit background, contains two pick-up tubes 12 and 13, which are both of the photo-scanned image iconoscope type, as described in the aforementioned U. S. Patent No. 2,619,531, and which are supplied with identical views of the plain background and the foreground components through a lens 19, and a block prism type optical system 11. The tube 12, which produces the silhouette picture signal has arranged in front of it a filter 10 which passes only ultra-violet light so that only the light projected on to the background screen 1 can pass through the filter and the resulting television picture signals is of a plain light background with black areas corresponding to and forming a silhouette of the outline of the foreground components. The tube 13, which produces the foreground picture signal has a filter 16 in front of it which passes visible light and rejects ultra-violet light so that the resulting television picture signal from tube 13 is of the details of the foreground components on a black background. The photo-cathodes of both tubes 12 and 13 are scanned simultaneously and in synchronism by means of a single scanning light spot produced on the face of the cathode ray tube 14, as described in the aforementioned U. S. Patent No. 2,619,531, which light spot is focussed by the objective lens 15, through the block prism 11, on to the photo-cathodes. Successful operation in this embodiment depends on the use in the scanning tube 14, of a phosphor which has approximately equal radiation both in the visible and ultra-violet wavelength ranges passed by the filters, otherwise the ultra-violet pass filter 10 in front of the tube 12 would prevent any scanning beam from reaching its photo-cathode. A suitable phosphor is that known as P16 as supplied by the Radio Corporation of America.

With the above described scanning arrangement of the tubes 12 and 13, errors in geometric registration between the silhouette image and the image of the foreground components are minimised, since any departures from scanning linearity in the scanning tube 14, are applied to both pick-up tubes.

The silhouette signal produced in the tube 12, is amplified and clipped in the amplifier 18, and applied to an input of the gating and mixer circuit 9. The foreground signal produced on the tube 13, is fed through an amplifier 17, also to the gating and mixer circuit 9.

A television camera 5, of a conventional type, is arranged to produce a television picture signal of the background components 6, for example by scanning a picture or model, the output signal of the camera 5, being fed over a cable 7, to a background amplifier 8. The output of the amplifier 7, is also fed to an input of the gating and mixer circuit 9. The amplifiers 8, 17 and 18, are conventional video amplifiers, as well known to persons skilled in the art, and may be constructed as described in U. S. Patent No. 2,649,501 to John Edward Cope, issued August 18, 1953.

The gating and mixer circuit 9 may be of any conventional type and is shown as comprising two pentode valves 21, 22 having a common anode resistor 23 from which the mixed output 20 is derived. The background signal from the amplifier 8 is fed to the control grid of the pentode 22 and the silhouette signal from the amplifier 18 is fed in negative sense to the suppressor grid of this pentode valve 22 in order to blank out those areas of the background signal which correspond to the areas to be occupied by the foreground components. The blanked out background signal appearing at the anode of the valve 22 is mixed with the foreground component signal at the anode of the pentode valve 21, to the control grid to which the foreground component signal from the amplifier 17 is fed, the resultant composite signal produced at the output 20 having the foreground component exactly filling the blanked out areas of the background signal. If desired, the silhouette signal may also be fed in a positive sense to the suppressor grid of the valve 21 so that this valve only conducts during the silhouette signal. This positive silhouette signal may be derived from the silhouette amplifier 18 in any convenient way, for example through a phase reverser 24 which, as is well known in the art, can comprise a single amplifier valve.

Whilst a particular embodiment has been described it will be understood that various modifications may be made without departing from the scope of the invention. For example, instead of using the gating and mixing circuit as described to produce the composite picture, the silhouette signal may be used to operate an electronic switch selecting between the signals of the foreground and background components.

I claim:

1. Apparatus for producing a composite television picture by combining separate picture signals representing respectively background components and foreground components, comprising a first light source illuminating a plain background with light of a wavelength lying in a first band of frequencies, a second light source illuminating the foreground components disposed in front of said plain background with light of a wavelength lying in a second band of frequencies different from said first band of frequencies, a first television pick-up tube of the photo-scanned image iconoscope type, a second television pick-up tube of the photo-scanned image iconoscope type, means for projecting on to the photo-cathodes of said first and second pick-up tubes from a common viowpoint, images of the foreground components in front of the plain background, a first filter which rejects light waves in said second frequency band interposed only in the path of the image projected on to said first pick-up tube, a second filter which rejects the light waves in said first frequency band interposed only in the path of the image projected on to said second pick-up tube, a light source, means for producing a moving light spot from said light source to produce a scanning raster on the photo-cathodes of said first and second pick-up tubes for simultaneously scanning said pick-up tubes in synchronism to produce two television signals in synchronism in the outputs of said first and second pick-up tubes respectively, means for producing a third television picture signal of the background components in synchronism with said other television signals, a mixing circuit means for feeding the output television signal from said second pick-up tube to said mixing circuit, means for feeding said third television signal to said mixing circuit, means for blanking out selected parts of said third television signal before mixing with the signal from the second pick-up tube and means for controlling said blanking out means by the output signal from said first pick-up tube.

2. Apparatus for producing a composite television picture by combining separate picture signals representing respectively background components and foreground components, comprising a first light source illuminating a plain background with light of a wavelength lying in a first band of frequencies a second light light source illuminating the foreground components disposed in front of said plain background with light of a wavelength lying in a second band of frequencies different from said first band of frequencies, a first television pick-up tube of the photo-scanned image iconoscope type, a second television pick-up tube of the photo-scanned image iconoscope type, means for projecting on to the photo-cathodes of said first and second pick-up tubes from a common viewpoint, images of the foreground components in front of the plain background, a first filter which rejects light waves in said second frequency band interposed only in the path of the image projected on to said first pick-up tube, a second filter which rejects light waves in said first frequency band interposed only in the path of the image projected on to said second pick-up tube, a light source producing light of a frequency band having a substantially equal radiation in said first and second band of frequencies, means for producing a moving light spot from said light source to form a scanning raster on the photo-cathodes of said first and second pick-up tubes for simultaneously scanning said pick-up tubes in synchronism to produce two television signals in synchronism in the outputs of said first and second pick-up tubes respectively, means for producing a third television picture signal of the background components in synchronism with said other television signals, a mixing circuit means for feeding the output television signal from said second pick-up tube to said mixing circuit, means for feeding said third television signal to said mixing circuit, means for blanking out selected parts of said third television signal before mixing with the signal from the second pick-up tube and means for controlling said blanking out means by the output signal from said first pick-up tube.

3. Apparatus for producing a composite television picture by combining separate picture signals representing respectively background components and foreground components, comprising a first light source illuminating a plain background with light of a wavelength lying in a first band of frequencies a second light source illuminating the foreground components disposed in front of said plain background with light of a wavelength lying in a second band of frequencies different from said first band of frequencies, a first television pick-up tube of the photo-scanned image iconoscope type, a second television pick-up tube of the photo-scanned image iconoscope type, means for projecting on to the photo-cathodes of said first and second pick-up tubes from a common viewpoint, images of the foreground components in front of the plain background, a first filter which rejects light waves in said second frequency band interposed only in the path of the image projected on to said first pick-up tube, a second filter which rejects light waves in said first frequency band interposed only in the path of the image projected on to said second pick-up tube, a cathode-ray tube, means for deflecting the beam of said cathode-ray tube to produce a light raster on the screen thereof, means for projecting said raster on to the photo-cathodes of said first and second pick-up tubes for simultaneously scanning said pick-up tubes in synchronism to produce two television signals in synchronism in the outputs of said first and second pick-up tubes respectively, means for producing a third television picture signal of the background components in synchronism with said other television signals, a mixing circuit means for feeding the output television signal from said second pick-up tube to said mixing circuit, means for feeding said third television signal to said mixing circuit, means for blanking out selected parts of said third television signal before mixing with the signal from the second pick-up tube and means for controlling said blanking out means by the output signal from said first pick-up tube.

4. Apparatus for producing a composite television picture by combining separate picture signals representing respectively background components and foreground components, comprising a first light source illuminating a plain background with light of a wavelength lying in a first band of frequency, a second light source illuminating the foreground components disposed in front of said plain background with light of a wavelength lying in a second band of frequencies, different from said first band of frequencies, a first television pick-up tube of the photo-scanned image iconoscope type, a second television pick-up tube of the photo-scanned image iconoscope type, means for projecting on to the photo-cathodes of said first and second pick-up tubes from a common viewpoint images of the foreground components in front of the plain background, a first filter which rejects light waves in said second frequency band interposed only in the path of the image projected on to said first pick-up tube, a second filter which rejects light waves in said first frequency band interposed only in the path of the image projected on to said second pick-up tube, a cathode-ray tube having a phosphor which produces light having substantially equal radiation in said first and second band of frequencies, means for deflecting the beam of said cathode-ray tube to produce a light raster on the screen thereof, means for projecting said raster on to the photo-cathodes of said first and second pick-up tubes for simultaneously scanning said pick-up tubes in synchronism to produce two television signals in synchronism in the outputs of said first and second pick-up tubes respectively, means for producing a third television picture signal of the background components in synchronism with said other television signals, a mixing circuit means for feeding the output television signal from said second pick-up tube to said mixing circuit, means for feeding said third television signal to said mixing circuit, means for blanking out selected parts of said third television signal before mixing with the signal from the second pick-up tube and means for controlling said blanking out means by the output signal from said first pick-up tube.

5. Apparatus for producing a composite television picture, comprising a first television pick-up tube of the photo-scanned image iconoscope type, a second television pick-up tube of the photo-scanned image iconoscope type, a first filter arranged in front of said first pick-up tube which rejects light waves in a first frequency band, a second filter arranged in front of said second pick-up tube which rejects light waves in a second frequency band different from said first frequency band, optical means arranged in front of said pick-up tubes to project on to the photo-cathodes thereof images from the same viewpoint, a light source, means for producing a moving light spot from said light source and means for projecting the moving light spot on to the photo-cathodes of said first and second pick-up tubes to scan said photo-cathodes simultaneously and in synchronism.

6. Apparatus for producing a composite television picture, comprising a first television pick-up tube of the photo-scanned image iconoscope type, a second television pick-up tube of the photo-scanned image iconoscope type, a first filter arranged in front of said first pick-up tube which rejects light waves in a first frequency band, a second filter arranged in front of said second pick-up tube which rejects light waves in a second frequency band different from said first frequency band, optical means arranged in front of said pick-up tubes to project on to the photo-cathodes thereof images from the same viewpoint, a light source producing light having a substantially equal radiation in said first and second frequency bands, means for producing a moving light spot from said light source and means for projecting the moving light spot on to the photo-cathodes of said first and second pick-up tubes to scan said photo-cathodes simultaneously and in synchronism.

7. Apparatus for producing a composite television picture, comprising a first television pick-up tube of the photo-scanned image iconoscope type, a second television pick-up tube of the photo-scanned image iconoscope type, a first filter arranged in front of said first pick-up tube which rejects light waves in a first frequency band, a second filter arranged in front of said second pick-up tube which rejects light waves in a second frequency band different from said first frequency band, optical means arranged in front of said pick-up tubes to project on to the photo-cathodes thereof images from the same viewpoint, a cathode-ray tube, means for deflecting the beam of said cathode-ray tube to produce a light raster on the screen of said cathode-ray tube and means for projecting said raster on to the photo-cathodes of said first and second pick-up tubes to scan said photo-cathodes simultaneously and in synchronism.

8. Apparatus for producing a composite television picture comprising a first television pick-up tube of the photo-scanned image iconoscope type, a second television pick-up tube of the photo-scanned image iconoscope type, a first filter arranged in front of said first pick-up tube which rejects light waves in a first frequency band, a second filter arranged in front of said second pick-up tube which rejects light waves in a second frequency band different from said first frequency band, optical means arranged in front of said pick-up tubes to project on to the photo-cathodes thereof images from the same viewpoint, a cathode-ray tube having a screen coated with a phosphor producing substantially equal light radiation in said first and second frequency bands, means for deflecting the beam of said cathode-ray tube to produce a light raster on the screen of said cathode-ray tube, and means for projecting said raster on to the photo-cathode of said first and second pick-up tubes to scan said photo-cathodes simultaneously and in synchronism.

References Cited in the file of this patent

UNITED STATES PATENTS 2,307,661 Batchelor ________________ Jan. 5, 1943

FOREIGN PATENTS 638,937 Great Britain ____________ June 21, 1950